United States Patent
Liu et al.

(10) Patent No.: US 9,767,427 B2
(45) Date of Patent: Sep. 19, 2017

(54) MODELING MULTI-DIMENSIONAL SEQUENCE DATA OVER STREAMS

(75) Inventors: Mo Liu, Worcester, MA (US); Song Wang, Austin, TX (US); Chetan Kumar Gupta, Austin, TX (US); Ismail Ari, Hayward, CA (US); Abhay Mehta, Austin, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 1605 days.

(21) Appl. No.: 12/432,951

(22) Filed: Apr. 30, 2009

(65) Prior Publication Data
US 2010/0280857 A1 Nov. 4, 2010

(51) Int. Cl.
*G06F 7/00* (2006.01)
*G06Q 10/08* (2012.01)
(52) U.S. Cl.
CPC .................................. *G06Q 10/087* (2013.01)
(58) Field of Classification Search
None
See application file for complete search history.

(56) References Cited

U.S. PATENT DOCUMENTS

| | | | |
|---|---|---|---|
| 6,573,907 B1* | 6/2003 | Madrane ...................... 715/719 |
| 2003/0126143 A1* | 7/2003 | Roussopoulos et al. ..... 707/100 |
| 2003/0236795 A1* | 12/2003 | Kemp et al. ............... 707/104.1 |
| 2009/0327330 A1* | 12/2009 | Abouzied et al. ........... 707/102 |
| 2010/0017380 A1* | 1/2010 | Naibo et al. ...................... 707/4 |
| 2010/0198777 A1* | 8/2010 | Lo et al. ...................... 707/601 |
| 2011/0166949 A1* | 7/2011 | Nguyen et al. .............. 705/26.2 |

OTHER PUBLICATIONS

Dong Xin, Star-Cubing: Computing Iceberg Cubes by Top-Down and Bottom-Up Integration, 2003.*
Lo, Eric et al, "OLAP on Sequence Data", Dept of Computing, The Hong Kong Polytechnic University, SIGMOV '08, Jun. 9-12, 2008, Vancouver, BC Canada.

* cited by examiner

*Primary Examiner* — Thu Nga Nguyen
(74) *Attorney, Agent, or Firm* — Law Office of Philip Scott Lyren

(57) ABSTRACT

One embodiment is a method that builds a model of multi-dimensional sequence data in real-time with cuboids that aggregate the multi-dimensional sequence data over both patterns and dimensions. The model provides search results for a query.

23 Claims, 5 Drawing Sheets

| EVENT STREAM 300 | | | |
|---|---|---|---|
| <type, | timestamp, | ID, | brand> |
| <f, | 1, | 1, | n> |
| <d, | 2, | 1, | n> |
| <f, | 3, | 2, | a> |
| <d, | 4, | 2, | a> |
| <f, | 5, | 3, | n> |
| <b, | 6, | 2, | a> |
| <s, | 7, | 2, | a> |
| <b, | 10, | 1, | n> |
| <s, | 11, | 1, | n> |
| <d, | 12, | 3, | n> |
| <c, | 14, | 1, | n> |
| <c, | 16, | 2, | a> |
| <b, | 18, | 3, | n> |
| <s, | 20, | 3, | n> |
| <c, | 26, | 3, | n> |

MODELING MULTI-DIMENSIONAL SEQUENCE DATA OVER STREAMS

BACKGROUND

Databases are electronic filing systems that store records or data in a computer system. Computer programs or users can send and retrieve data from the database using a database management system (DBMS).

The amount of data stored in database systems has been continuously increasing over the last few decades. Database management systems manage large volumes of data that need to be efficiently accessed and manipulated. Queries to the database are becoming increasingly complex to execute in view of such massive data structures. If queries to the database are not completed in a sufficient amount of time, then acceptable performance is difficult to achieve.

Some database systems store data using multiple attributes or dimensions. These multidimensional databases enable vast amounts of data to be stored. At the same time, such multidimensional databases pose challenges to efficiently locate and retrieve data in a timely fashion.

DETAILED DESCRIPTION

Exemplary embodiments in accordance with the invention include apparatus, systems, and methods that provide event pattern analysis over multi-dimensional data in real-time.

Exemplary embodiments in accordance with the invention analyze vast amounts of multi-dimensional sequence data being streamed into data warehouses or databases. For example, many data warehouses include large amounts of application data that exhibits logical sequential ordering among individual data items, such as radio-frequency identification (RFID) data and sensor data.

Embodiments in accordance with the invention provide a new approach (referred to as E-Cube) to integrate complex event processing and OLAP techniques to provide pattern analysis functionalities including negation, and complex predicates over multidimensional spatio-temporal stream data. The model is composed of cuboids that associate patterns and dimensions at certain abstraction level. As one example, the E-Cube differs from a traditional data cube in that the E-Cube aggregates not only over dimensions but also over patterns. To cope with the enormous volumes of multi-dimensional sequential data streams, exemplary embodiments use an E-Cube model that employs pattern encoding, partial materialization, and incremental refresh which minimizes memory consumption for online operational decision making. The E-Cube model is composed of cuboids that associate patterns and dimensions at a certain abstraction level.

Exemplary embodiments leverage OLAP techniques in databases to allow users to navigate or explore the data at different abstraction levels while simultaneously supporting real-time multi-dimensional sequence data analysis. Furthermore, complex event processing (CEP) is used for pattern matching in a variety of applications, ranging from RFID tracking for supply chain management to real-time intrusion detection. Exemplary embodiments which utilize E-Cube integrate OLAP and CEP techniques for timely real-time multi-dimensional pattern analysis over event streams.

For purposes of illustration, an exemplary embodiment of E-Cube is discussed in connection with an RFID system used in supply chain management. Exemplary embodiments are not limited to RFID systems since E-Cube is usable for pattern detection among event streams in numerous applications.

RFID technology is widely used to track the movement and status of products in the supply chain management. Terabytes of RFID data are generated every day. Facing the huge volume of RFID data, the E-Cube system enables pattern detection at different abstraction levels.

Figures 1, 2:
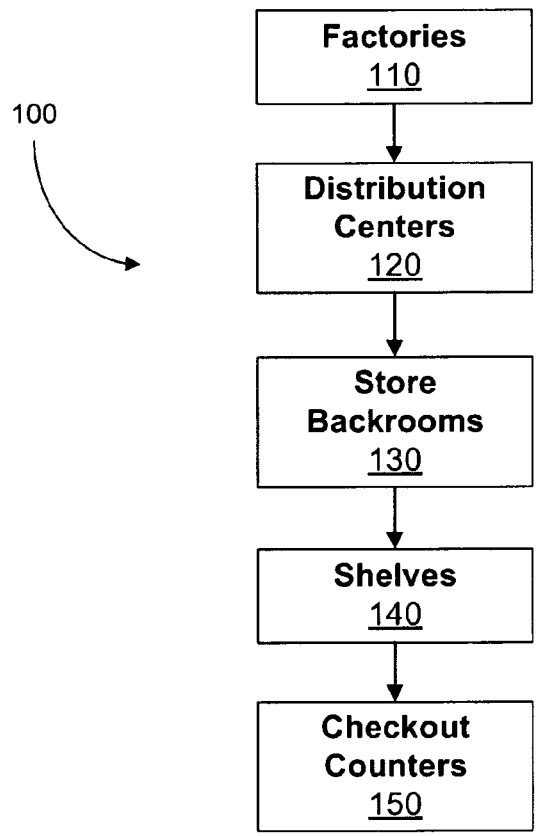
FIG. 1 shows an exemplary supply chain for products in accordance with an exemplary embodiment.
FIG. 2 shows exemplary queries for a supply chain in accordance with an exemplary embodiment.

FIG. 1 shows an exemplary supply chain 100 for products in accordance with an exemplary embodiment. The supply chain follows the history of products from manufacturing at a factory to sales at a retail store. By way of example, the products are manufactured at factories (F) 110 and then transported or shipped to distribution centers (D) 120. Next, the products are transferred to retail store backrooms (B) 130 and then to shelves (S) 140 of the store. The products are then sold at checkout counters (C) 150.

FIG. 2 shows exemplary queries for a supply chain in accordance with an exemplary embodiment. A product manager utilizes the E-Cube system to analyze products moving in real-time throughout the whole supply chain.

As shown in block 200, queries are posed to continuously monitor the products as they pass from factories (F) to distribution centers (D), regional retail store backrooms (B), shelves (S), and checkout counters (C) within 72 hours.

Block 210 shows a second query. Here, a store manager requests detailed information related to the store process in a timely manner. The query continuously monitors the items that pass from transportation to regional retail store backrooms, shelves, and checkout counters within 24 hours. The pattern (F, D) is rolled up into Transportation as Query 2.

Block 220 shows a third query. Here, the manager is primarily interested in the transportation process. The query continuously monitors the items that pass from factories, distribution centers, trucks, to store within 72 hours. The pattern (B, S, C) is rolled up into Store.

FIG. 2 illustrates the use of pattern analysis over OLAP data cube since the queries raised by store manager and transportation manager above share the same base pattern query SEQ (F, D, B, S, C) with the product manager.

The following nomenclature is used to assist in describing exemplary embodiments in accordance with the invention.

As used herein, "event" is an occurrence of a tuple of interest, which can be either primitive or composite as further introduced below. A primitive event instance is the smallest, atomic occurrence of a stream tuple of interest in a system.

A "composite event instance" is represented as a list of constituent primitive event instances $<e_1, e_2, \ldots, e_n>$. Similar event instances are grouped into a composition event type. That is, each event type $E_j$ corresponds to a set of event instances.

Event types describe a set of attributes that the class of event instances shares. Capitalized letters are used for event types such as $E_j$. An event type can be either a primitive event type or a composite event type. Primitive event types are pre-defined in the application domain of interest. Composite event types are aggregated event types that are created by combining other primitive and/or composite event types. The instance $e_i$ (resp. $<e_1, e_2, \ldots, e_n>$) instantiates the attributes of the event type $E_j$. The attributes are associated with a concept hierarchy.

Figures 3, 4:
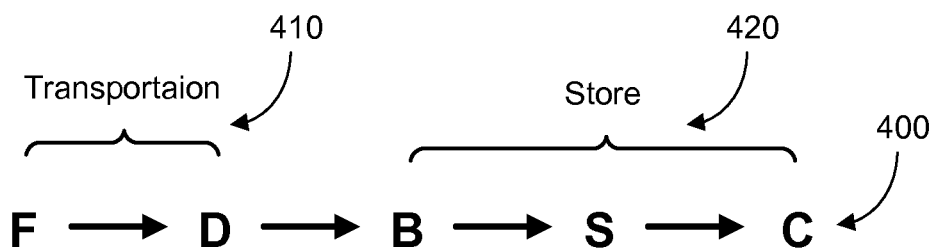
FIG. 3 shows a partial event stream containing primitive event instances in accordance with an exemplary embodiment.
FIG. 4 shows an example of pattern aggregation for a supply chain in accordance with an exemplary embodiment.

FIG. 3 shows a partial event stream 300 containing primitive event instances. In example embodiment, the event stream 300 is divided into four columns: type, timestamp (ts), identification (IDS), and brand. This division provides an RFID reading for products to have the following format: <type, timestamp, ID, brand>. Types refer to different locations such as factories and stores. Timestamp represents the time when the reading is generated. Attribute ID refers to the factory ID of one product. Brand refers to a class of goods identified by name as the product of a single manufacturer.

With E-Cube, there are two kinds of aggregation lattices: Category and Pattern aggregation. Some or all aggregation has an associated concept hierarchy.

"Category aggregation" uses concepts of a data cube wherein the attributes of an item have a set of dimensions describing its characteristics. Each of these dimensions is associated with a concept hierarchy.

"Pattern aggregation" is a pattern viewed at different abstraction levels depending on the focus of the users. In other words, some sub-pattern are rolled up if they are not important or desired by a particular user.

FIG. 4 shows an example of pattern aggregation 400 for a supply chain that includes factories (F) to distribution centers (D) to store backrooms (B) to shelves (S) to checkout counters (C). For example, the store manager in the motivating example, the sub-pattern from factories, distribution centers to trucks is rolled up into transportation (shown at 410) while the locations related to a store are kept individually. The sub-pattern from store backrooms to shelves to checkout counters is rolled up into store (shown at 420) while the movement of the goods from the factories to the distribution centers are kept unchanged.

"Partial materialization" over the E-Cube is used to get a balance between performance and resource usage. By way of example, one exemplary embodiment only materializes composite event instances for the aggregated pattern. Results for higher abstraction layers are computed bottom up in the pattern hierarchy tree.

The description is now directed to describing E-Cube.

A E-Cube is composed of E-Cuboids. One E-Cuboid can be specified by the language below:

```
PATTERN <event pattern>
CLUSTER BY <attribute lists>
[WHERE <qualification>]
[WITHIN <window>]
[RETURN <output specification>]
``` where,
<event pattern>::=SEQ($(E_j)^+$)(i =1, 2, ..., n)
<qualification>::= conjunctive and dis-conjunctive predicates
<window>::=time duration.

The event pattern is an ordered set of event types that are used to specify the pattern abstraction level. SEQ in the EVENT pattern specifies a particular order in which the events of interest should occur.

The CLUSTER BY clause specifies the category abstraction level of event attributes.

The WHERE clause contains a condition on some common attributes across multiple event types in the query. For example, this condition could be on transaction ids, RFIDs, etc.

The WITHIN clause checks if the temporal difference between the first and last event instances is greater than the window.

The RETURN clause transforms each event instance into a result instance as specified in the output specification.

E-Cube is a collection of cuboids where the base cuboid corresponds to a bottom most pattern in the pattern hierarchy that are obtained by rolling up an event pattern or categories of an attribute. Other cuboids correspond to the other patterns in the hierarchy.

An event cuboid is characterized by the pair $<P_l, A_l>$. $P_l$ refers to a pattern aggregated abstraction level. $A_l$ refers to an attribute aggregated abstraction level. Particularly, an event cuboid has the following properties:

(1) Each cuboid has one pattern and various attribute dimensions associated.
(2) The pattern and attributes belong to a concept hierarchy.
(3) The pattern and attributes can be aggregated.
(4) All event instance in one event cuboid have the same pattern and the same aggregated attribute level.

An exemplary embodiment in accordance with the invention uses an algebraic approach. A pattern query expressed by the event cube language is translated into a query plan composed of Grouping, Window Sequence (WinSeq), and Selection (Sel) operators. The Grouping operator denoted by Grouping (Attribute) partitions the input event stream into different clusters according to the attribute value. The WinSeq operator denoted WinSeq ($E_1, E_2, \ldots, E_n$, window) extracts all matches to the event pattern specified in the query. WinSeq also checks whether all matched event sequences occur within the specified sliding window. The Sel operator, expressed as Sel (P), where P denotes a set of predicates on event attributes, filters event sequences by applying all the predicates specified in the query. The qualification in the WHERE clause provides the parameters of Sel. Simple predicates are pushed down to WinSeq.

Window Partition Sequence Operator (WinPSeq) implements the Grouping and the WinSeq operators. It partitions the event instances into clusters with different attribute values. Next, it constructs event sequences for each partition.

WinPSeq employs a non-deterministic finite automaton (NFA) for pattern retrieval. Let N denote the number of event types in the pattern. Then the number of states in the NFA equals N+1 (including the starting state). A data structure named SeqState associates a stack with each state of the NFA storing the events that trigger the NFA transition to this state. For each instance e in a stack, an extra field named PreEve records the nearest instance in terms of time sequence in the stack of the previous state.

FIG. 3 shows an exemplary partial input event stream 300. All retrieved events of type F, D, B, S and C are extracted by WinPSeq and kept in SeqState.

Figure 5:
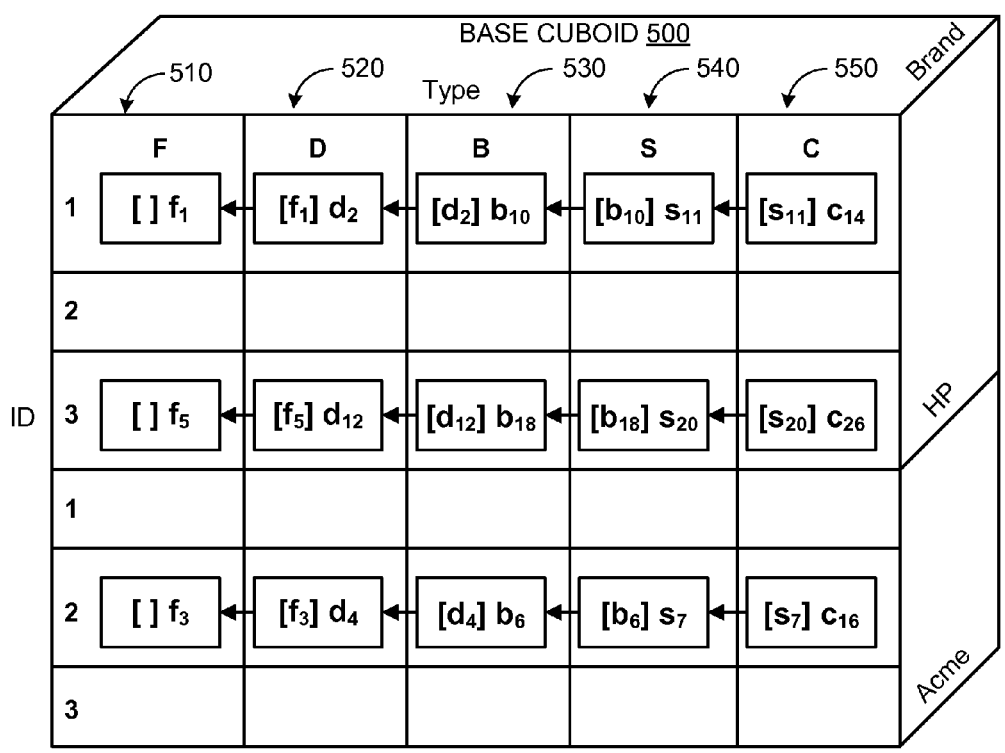
FIG. 5 shows an example of a cuboid in accordance with an exemplary embodiment.

FIG. 5 shows the partitioned active instance stacks of SeqState in a base cuboid 500 after receiving the given portion of stream S. The cuboid 500 includes a plurality of stacks labeled factories 510 (F), distribution-centers 520 (D), store backrooms 530 (B), shelves 540 (S), and checkout counters 550 (C). In each stack, its instances are listed from top to bottom in the order of their arrival. The pointers between the stacks indicate the arrival ordering between event instances of different types. For example, the instance in stack S (holding event instances of type S) before $c_{14}$ is $s_{11}$. The PreEve field of $c_{14}$ is set to $s_{11}$, as shown in the parenthesis preceding $c_{14}$. WinPSeq has three core functions (insert, compute, and purge) as described below:

Insert: With the assumption that events come in order, each received positive event instance is appended at the end of the corresponding stack and its PreEve field is set as the last event in the previous stack.

Compute: When the newly inserted event is an instance of the accepting stack then WinPSeq compute is initiated. With SeqState, the construction is simply done by a depth first search in the DAG that is rooted at this instance e and contains all the virtual edges reachable from this root. Each root-to-leaf path in the DAG corresponds to one matched event sequence to be returned. After receiving the events, WinPSeq outputs the three event sequences depicted in FIG. 5.

Purge: Purge of the WinPSeq state removes all outdated events from SeqState based on window constraints. Any old event instance ei kept in SeqState can be safely purged from the bottom of stack once an event $e_k$ with $(e_k.ts-e_i.ts)>W$ is received by the query engine.

Discussion now turns to the construction steps of an E-Cube given an incoming stream. Event instances are partitioned to encode both the pattern and the attribute concept hierarchy information and thus facilitate efficient multi-dimensional processing as discussed below:

(1) Pattern hierarchy in an event-cube is first constructed according to pattern clause.

(2) Each cuboid is associated with WinPSeq and Sel operators described above.

(3) When event instances come, they are processed by WinPSeq and Sel operators in the base cuboid. There are not any roll up operations on the base cuboid.

(4) The construction process for other cuboids is bottom up in the pattern hierarchy and category hierarchy.

(5) New results are incremental updated by propagating through hierarchies.

One example of the constructed base E Cuboid is shown in FIG. 5 given the input partial event stream in FIG. 3.

One exemplary embodiment of an E-OLAP system adopts a set of OLAP operations, namely, attribute roll-up/drill-down, slice, and dice for the manipulation of the aggregation lattice. For example, the product manager modifies the E-OLAP query Q1 so that products are grouped based on factory ID. To achieve this grouping, the system performs a roll-up operation on the attribute dimension, going from the abstraction level individual product to a higher abstraction level factory.

For pattern manipulation, the system performs a pattern roll-up operation that moves the pattern abstraction one level up the concept hierarchy. As an example, to answer Query 3 220 in FIG. 2 for the transportation manager, a roll-up of (B, S, C) occurs into Store type. For the store, information is not the focus of the transportation manager. One exemplary embodiment only stores partial information depending on application requirements for the composite event instance of Store type.

Figure 6:
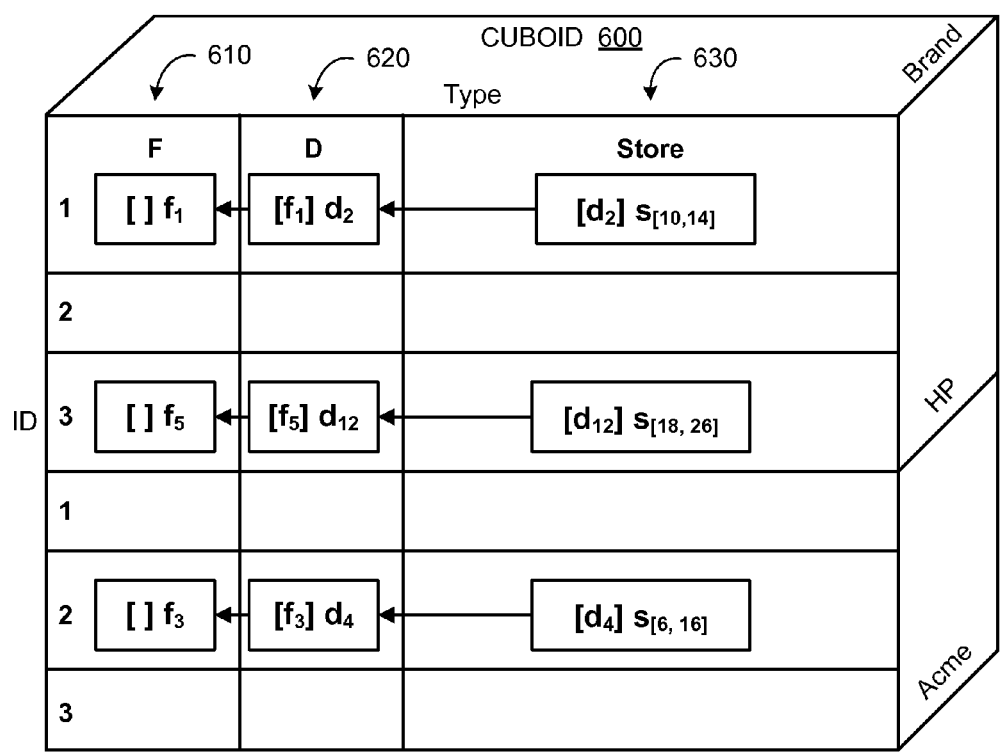
FIG. 6 shows an example of a cuboid for a query in accordance with an exemplary embodiment.

FIG. 6 shows an example of a cuboid 600 for the query 3 of FIG. 5 in accordance with an exemplary embodiment. The cuboid 600 includes a plurality of stacks labeled factories 610 (F), distribution centers 620 (D), and stores 630. In this cuboid, the timestamp and event type information are stored for the composite event instances of store type. The composite event instance of Store type occurs during one interval. It has one start timestamp (B.ts) and one end timestamp (C.ts). The sequence results can be computed by WinPSeq operator in the higher level cuboid.

Figure 7:
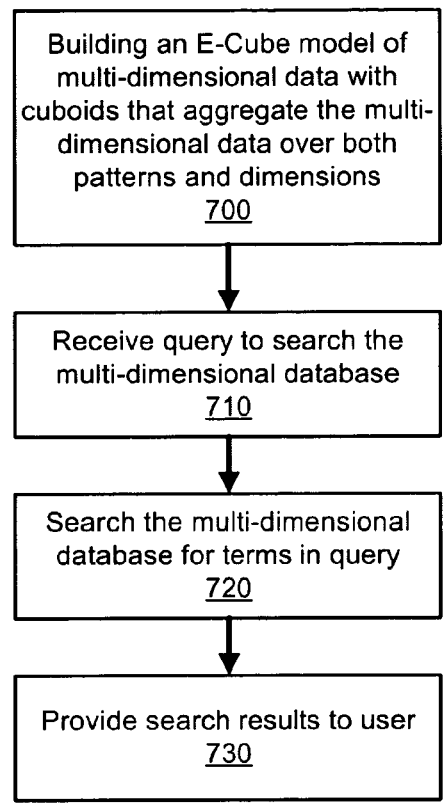
FIG. 7 is a flow diagram for traversing a multidimensional database while searching a query in accordance with an exemplary embodiment.

FIG. 7 is a flow diagram for traversing a multidimensional database while searching a query in accordance with an exemplary embodiment.

According to block 700, an E-Cube model is built of multi-dimensional data with cuboids that aggregate the multi-dimensional data over both patterns and dimensions. In one exemplary embodiment, the E-Cube model integrates both event processing (CEP) and online analytical processing (OLAP) techniques to perform pattern analysis over event streams in the multi-dimensional data.

According to block 710, a query is received to search a multi-dimensional database.

According to block 720, the database is searched for the terms or keywords in the query.

According to block 730, results of the query are provided to the user. For example, the results of the query are displayed to the user on a display, stored in a computer, or provided to another software application.

Figure 8:
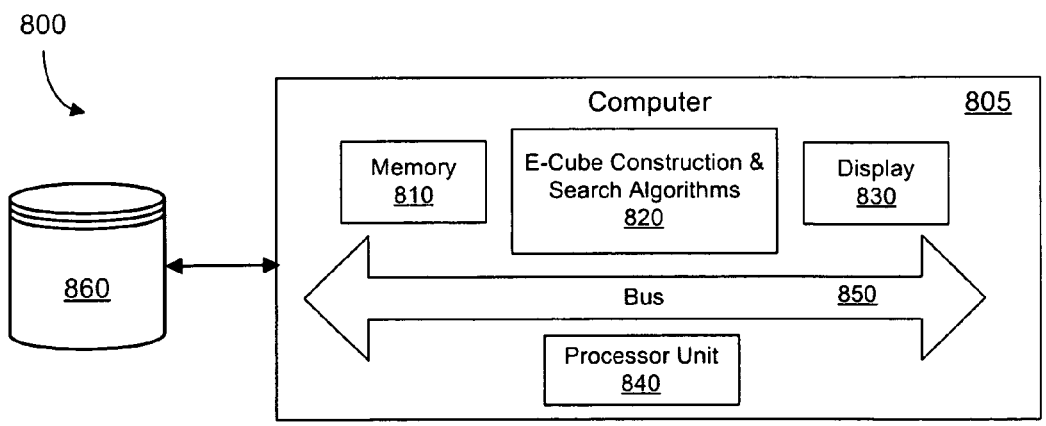
FIG. 8 is a block diagram of a computer for executing methods in accordance with an exemplary embodiment.

FIG. 8 is a block diagram of a computer system 800 in accordance with an exemplary embodiment of the present invention. In one embodiment, the computer system includes a database or warehouse 860 and a computer or electronic device 805 that includes memory 810, E-Cube construction and search algorithms 820, display 830, processing unit 840, and one or more buses 850.

In one embodiment, the processor unit includes a processor (such as a central processing unit, CPU, microprocessor, application-specific integrated circuit (ASIC), etc.) for controlling the overall operation of memory 810 (such as random access memory (RAM) for temporary data storage, read only memory (ROM) for permanent data storage, and firmware). The processing unit 840 communicates with memory 810 and algorithms 820 via one or more buses 850 and performs operations and tasks necessary for constructing an E-Cube structure and for ascending and descending a multidimensional database while searching a query. The memory 810, for example, stores applications, data, programs, algorithms (including software to implement or assist in implementing embodiments in accordance with the present invention) and other data.

The E-Cube system supports both pattern and category aggregations that answer pattern queries over multi-dimensional stream data in real time. The system makes use of complex event processing (CEP) and OLAP techniques. Exemplary embodiments employ the complex event pattern hierarchy and propose primary operations on E-Cube in the streaming event scenario. Exemplary embodiments are used in multidimensional or high dimensional indexing structures of databases. Such databases are often queried by specifying a range in each dimension, and the database is searched to find all the data items that satisfy the query.

Definitions

As used herein and in the claims, the following words are defined as follows:

The term "complex event processing" or "CEP" is a processing concept that identifies events within an event cloud. CEP uses various techniques such as detection of complex patterns of many events, event correlation and abstraction, event hierarchies, and relationships between events.

The term "database" means records or data stored in a computer system such that a computer program or person using a query language can send and/or retrieve records and data from the database. Users pose queries to the database, and records retrieved in the answer to queries contain information that is used to make decisions.

The term "E-Cube" is a collection of cuboids such that a base cuboid corresponds to a bottom most pattern in a pattern hierarchy that is obtained by rolling up an event pattern or categories of an attribute.

The term "multidimensional database" or "high dimensional database" means a database wherein data is accessed or stored with more than one attribute (a composite key). Data instances are represented with a vector of values, and a collection of vectors (for example, data tuples) are a set of points in a multidimensional vector space.

The term "OLAP" and "online analytical processing" is business intelligence that uses relational reporting and data mining in a multi-dimensional model to answer queries to stored data.

In one exemplary embodiment, one or more blocks or steps discussed herein are automated. In other words, apparatus, systems, and methods occur automatically. The terms "automated" or "automatically" (and like variations thereof) mean controlled operation of an apparatus, system, and/or process using computers and/or mechanical/electrical devices without the necessity of human intervention, observation, effort and/or decision.

The methods in accordance with exemplary embodiments of the present invention are provided as examples and should not be construed to limit other embodiments within the scope of the invention. Further, methods or steps discussed within different figures can be added to or exchanged with methods of steps in other figures. Further yet, specific numerical data values (such as specific quantities, numbers, categories, etc.) or other specific information should be interpreted as illustrative for discussing exemplary embodiments. Such specific information is not provided to limit the invention.

In the various embodiments in accordance with the present invention, embodiments are implemented as a method, system, and/or apparatus. As one example, exemplary embodiments and steps associated therewith are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from long-term storage media of some type, such as a CD-ROM drive or hard drive. The software programming code is embodied or stored on any of a variety of known media for use with a data processing system or in any memory device such as semiconductor, magnetic and optical devices, including a disk, hard drive, CD-ROM, ROM, etc. The code is distributed on such media, or is distributed to users from the memory or storage of one computer system over a network of some type to other computer systems for use by users of such other systems. Alternatively, the programming code is embodied in the memory, and accessed by the processor using the bus. The techniques and methods for embodying software programming code in memory, on physical media, and/or distributing software code via networks are well known and will not be further discussed herein.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
building, with a computer, a model of multi-dimensional sequence data in real-time with cuboids that aggregate the multi-dimensional sequence data over both patterns and dimensions, wherein building the model in real-time includes:
processing event instances into a base cuboid of the model as the event instances come; and
incrementally updating one or more other cuboids in the model by propagating the event instances bottom-up through a pattern hierarchy and a category hierarchy; and
providing, with a computer, search results for a query in real-time as events that are aggregated into the multi-dimensional sequence data occur.

2. The method of claim 1, wherein the multi-dimensional sequence data is a stream of radio-frequency identification (RFID) data.

3. The method of claim 1 further comprising, integrating in real-time both complex event processing (CEP) which includes detection of a sequence or a set of events that are related spatially or temporarily and online analytical processing (OLAP) techniques to provide pattern analysis functionalities.

4. The method of claim 3, wherein the pattern analysis functionalities include negation and querying over multi-dimensional spatio-temporal stream data.

5. The method of claim 1 further comprising, using online analytical processing (OLAP) techniques to analyze event patterns in real-time for the multi-dimensional sequence data.

6. The method of claim 1 further comprising, displaying search results on a display of a computer.

7. The method of claim 1, wherein the query requests tracking of radio-frequency identification (RFID) data for supply chain management of products using E-Cube.

8. The method of claim 1, wherein the model is an E-Cube that is a collection of cuboids in which the base cuboid corresponds to a most general pattern in the pattern hierarchy, and the one or more other cuboids are obtained by rolling up an event pattern or categories of an attribute.

9. A tangible computer readable storage medium having instructions for causing a computer to execute a method, comprising:
building a model of multi-dimensional sequence data in real-time with cuboids that aggregate the multi-dimensional sequence data over both patterns and dimensions, wherein building the model in real-time includes:
processing event instances into a base cuboid of the model as the event instances come; and
incrementally updating one or more other cuboids in the model by propagating the event instances bottom-up through a pattern hierarchy and a category hierarchy.

10. The tangible computer readable storage medium of claim 9, wherein the model is an E-Cube that is a collection of cuboids such that the base cuboid corresponds to a most general pattern in the pattern hierarchy, and the one or more other cuboids are obtained by rolling up an event pattern or categories of an attribute.

11. The tangible computer readable storage medium of claim 9, wherein the multi-dimensional sequence data is stream data from a sensor or radio-frequency identification (RFID).

12. The tangible computer readable storage medium of claim 9 further comprising, detecting patterns in the multi-dimensional sequence data.

13. The tangible computer readable storage medium of claim 9 further comprising, querying the E-Cube to track movement and status of products in a supply chain.

14. A computer system, comprising:
   a database that stores an E-Cube model of multi-dimensional sequence data in real-time with cuboids that aggregate the multi-dimensional sequence data over both patterns and dimensions, wherein the database:
   processes event instances into a base cuboid of the E-Cube model as events that are aggregated into the multi-dimensional sequence data occur; and
   incrementally updates one or more other cuboids in the E-Cube model by propagating the event instances bottom-up through a pattern hierarchy and a category hierarchy; and
   a computer that processes a query and provides results for the query in real time as the events occur.

15. The computer system of claim 14, wherein patterns in the multi-dimensional sequence data are rolled up and aggregated in the pattern hierarchy.

16. The computer system of claim 14, wherein the E-Cube model that is a collection of cuboids such that the base cuboid corresponds to a most general pattern in the pattern hierarchy, and the one or more other cuboids are obtained by rolling up an event pattern or categories of an attribute.

17. The computer system of claim 14, wherein the computer processes the query over multi-dimensional stream data in real time.

18. The computer system of claim 14, wherein the E-Cube model integrates both complex event processing (CEP) and online analytical processing (OLAP) techniques to provide pattern analysis functionalities for queries to the database.

19. The computer system of claim 14, wherein the E-Cube model is a collection of cuboids with each cuboid having one pattern and multiple attribute dimensions, and patterns and attributes are aggregated.

20. The computer system of claim 14, wherein for each of the cuboids in the E-Cube model, all event instances in the cuboid have a same pattern and a same aggregated attribute level.

21. The computer system of claim 14, wherein processing the event instances into the base cuboid comprises:
   associating the event instances respectively with stacks corresponding to types of the event instances; and
   linking the event instances associated a first of the stacks to the event instances associated with a second of the stacks, wherein the first stack and the second stack correspond to consecutive states in a pattern over which events are aggregated.

22. The method of claim 1, wherein processing the event instances into the base cuboid comprises:
   associating the event instances respectively with stacks corresponding to types of the event instances; and
   linking the event instances associated a first of the stacks to the event instances associated with a second of the stacks, wherein the first stack and the second stack correspond to consecutive states in a pattern over which events are aggregated.

23. The method of claim 22, wherein linking event instances employs a pointer associated with one of the event instances and pointing to another of the event instances.

* * * * *